United States Patent
Lin

(10) Patent No.: US 8,903,081 B2
(45) Date of Patent: Dec. 2, 2014

(54) METHOD, APPARATUS, AND SYSTEM FOR CONTROLLING STORAGE OF USER INPUT INFORMATION

(75) Inventor: Yangbo Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 915 days.

(21) Appl. No.: 13/019,582

(22) Filed: Feb. 2, 2011

(65) Prior Publication Data

US 2011/0135037 A1  Jun. 9, 2011

Related U.S. Application Data

(63) Continuation of application No. PCT/CN2009/072977, filed on Jul. 29, 2009.

(30) Foreign Application Priority Data

Aug. 14, 2008 (CN) .......................... 2008 1 0142469

(51) Int. Cl.
*H04M 3/00* (2006.01)
*H04M 5/00* (2006.01)
*H04M 3/42* (2006.01)
*H04W 12/00* (2009.01)

(52) U.S. Cl.
CPC .......... *H04M 3/42221* (2013.01); *H04W 12/00* (2013.01)
USPC .......................................... 379/283; 379/284

(58) Field of Classification Search
USPC ................... 379/283, 220.01, 284, 286, 242; 370/352; 375/316; 386/248, 239, 234
See application file for complete search history.

(56) References Cited

U.S. PATENT DOCUMENTS

| 5,825,871 A | 10/1998 | Mark |
| 2003/0002478 A1* | 1/2003 | El-Gebaly et al. ............ 370/352 |
| 2004/0147255 A1 | 7/2004 | Lee |
| 2006/0148452 A1 | 7/2006 | Oh |
| 2008/0317238 A1* | 12/2008 | Cai et al. .................. 379/220.01 |

FOREIGN PATENT DOCUMENTS

CA  2515629 A1  2/2007

(Continued)

OTHER PUBLICATIONS

Written Opinion of the International Searching Authority for International Application No. PCT/CN2009/072977 mailed on Sep. 30, 2009.
Foreign Communication From A Counterpart Application, European Application No. 09806343.1 European Office Action dated Oct. 16, 2013, 5 pages.

(Continued)

*Primary Examiner* — Thjuan K Addy
(74) *Attorney, Agent, or Firm* — Huawei Technologies Co., Ltd.

(57) ABSTRACT

When receiving Dual Tone Multi-Frequency (DTMF) information, we provide a way to determine whether to store such, which may include sensitive user input information. More specifically, a media gateway (MG) obtains DTMF digit mask control information, which indicates whether DTMF digit information may include sensitive user input information not suitable for storage. Based thereon, it decides, whether to store the received DTMF digit information. In this way, the DTMF digit mask control information controls whether to store the user input information on the DTMF digit information processing device in the architecture with the service function being separated from the bearing function; thus, avoiding information security risks brought by indiscriminate storage of sensitive contents in the user input information.

10 Claims, 2 Drawing Sheets

(56) References Cited

FOREIGN PATENT DOCUMENTS

| | | | |
|---|---|---|---|
| CN | 1802026 | A | 7/2006 |
| CN | 101212735 | A | 7/2008 |
| JP | 2000232535 | A | 8/2000 |
| JP | 2001308986 | A | 11/2001 |
| KR | 10-2004-0010941 | | 2/2004 |
| WO | WO 2008/003247 | A1 | 1/2008 |

OTHER PUBLICATIONS

International Search Report for International Application No. PCT/CN2007/070097 mailed on Sep. 20, 2007 (4 pgs.).

European Patent Office Communication for Application No. 09806343.1-2414; related to the extended European search report, pursuant to Rule 62 EPC, the supplementary European search report (Art. 153(7) EPC) and the European search opinion; dated (mailed) Jun. 22, 2012; Huawei Tech Co., Ltd. (6 pgs.).

* cited by examiner

METHOD, APPARATUS, AND SYSTEM FOR CONTROLLING STORAGE OF USER INPUT INFORMATION

CROSS-REFERENCE TO RELATED APPLICATIONS

This application is a continuation of International Application No. PCT/CN2009/072977, filed on Jul. 29, 2009, which claims priority to Chinese Patent Application No. 200810142469.3, filed on Aug. 14, 2008, both of which are hereby incorporated by reference in their entireties.

FIELD OF THE INVENTION

The present invention relates to the field of communication technologies, and in particular, to a method, an apparatus, and a system for controlling storage of user input information.

BACKGROUND

A Media Gateway Controller (MGC) and a Media Gateway (MG) are two key components of a packet-based network in an architecture where the service function is separated from the bearing function. The MGC is responsible for the service control function, and the MG is responsible for the media bearing function. In this way, the service control plane is separated from the media bearer plane, network resources are shared sufficiently, device upgrade and service extension are simplified, and the costs of development and maintenance are slashed.

Under control of the MGC, the MG may interact with other devices such as User Agent (UA) representative of the user to distribute information to the user or collect information from the user.

In the process of implementing the present invention, the inventor finds at least these problems in the prior art: In certain service scenarios, after the user sends information to the MG in a certain mode such as Dual Tone Multi-Frequency (DTMF) input, the information may be stored by the MG itself (for example, stored in the record file of the MG) when the information is reported by the MG to the MGC for processing. If the information includes sensitive contents, for example, the identity card number of the user or account number of the credit card of the user, the indiscriminate storage of the sensitive contents impairs information security seriously.

SUMMARY

The embodiments of the present invention provide a method, an apparatus, and a system for controlling storage of user input information so that the storage of the user input information is controlled in the architecture with the service function being separated from the bearing function.

The embodiments of the present invention provide the following technical solutions:

A method for controlling storage of user input information includes:

obtaining DTMF digit mask control information which indicates whether DTMF digit information is suitable for storage; and deciding, when receiving DTMF digit information, whether to store the received DTMF digit information according to the obtained DTMF digit mask control information.

A DTMF digit information processing device includes:

an obtaining unit, configured to obtain DTMF digit mask control information which indicates whether DTMF digit information is suitable for storage;

a receiving unit, configured to receive DTMF digit information; and a storing unit, configured to store the DTMF digit information received by the receiving unit if the DTMF digit mask control information obtained by the obtaining unit indicates that the DTMF digit information is suitable for storage.

A controlling device provided in an embodiment of the present invention includes a delivering unit, which is configured to deliver DTMF digit mask control information to a DTMF digit information processing device, where the DTMF digit mask control information indicates whether DTMF digit information is suitable for storage, where when the DTMF digit information processing device receives DTMF digit information, decides whether to store the received DTMF digit information according to the DTMF digit mask control information.

A system for controlling storage of user input information includes:

a controlling device, configured to deliver DTMF digit mask control information to a DTMF digit information processing device, where the DTMF digit mask control information indicates whether DTMF digit information is suitable for storage; and a DTMF digit information processing device, configured to obtain the DTMF digit mask control information, receive DTMF digit information, and decide whether to store the received DTMF digit information according to the obtained DTMF digit mask control information after receiving the DTMF digit information.

Therefore, in the embodiments of the present invention, the DTMF digit mask control information controls whether to store the user input information on the DTMF digit information processing device in the architecture with the service function being separated from the bearing function, thus avoiding information security risks brought by indiscriminate storage of sensitive contents in the user input information.

DETAILED DESCRIPTION OF THE EMBODIMENTS

A method for controlling storage of user input information according to an embodiment of the present invention includes: obtaining DTMF digit mask control information which indicates whether DTMF digit information is suitable for storage; receiving DTMF digit information; and deciding whether to store the received DTMF digit information according to the obtained DTMF digit mask control information. The foregoing operations may be performed by an MG, or a media resource processing device, or a media delivery function device.

According to embodiments of the present invention, in the architecture with the service being separated from the bearer, the DTMF digit mask control information controls whether to store the user input information in a way that the DTMF digit mask control information is used for indicating whether user input information is suitable for storage, thus avoiding information security risks that occur when the DTMF digit information processing device store sensitive contents in the user input information indiscriminately.

Figure 1:
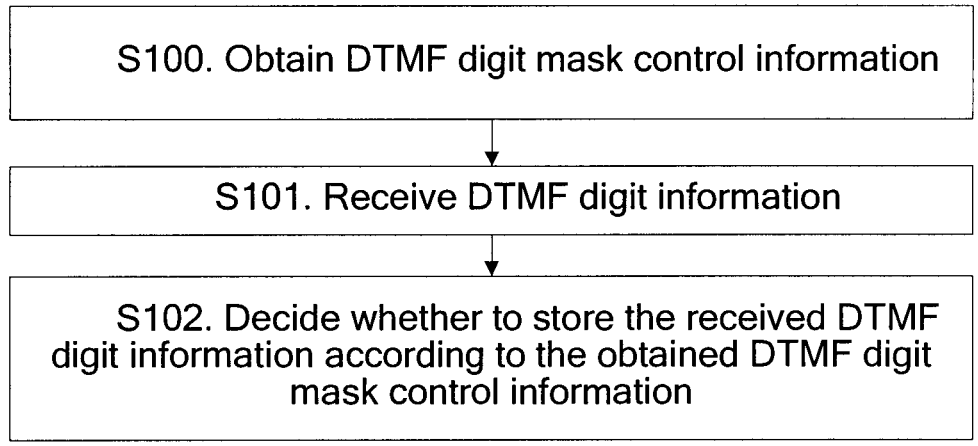
FIG. 1 is a flowchart of a method for controlling storage of user input information according to a first embodiment of the present invention.

FIG. 1 is a flowchart of the first embodiment of the present invention.

In this embodiment, an MGC (or a media resource control device, or a media control function device) sends DTMF digit mask control information to the MG, or the DTMF digit mask control information is preset on the MG to indicate whether the DTMF digit information is suitable for storage. Therefore, the steps performed by the MG in this embodiment include:

S100. Obtain DTMF digit mask control information.
S101. Receive DTMF digit information.
S102. Decide whether to store the received DTMF digit information according to the obtained DTMF digit mask control information.

The MG obtains the DTMF digit mask control information in either of the following two modes: The MGC delivers the information, or the information is preset on the MG.

The following gives more details:

Generally, the MGC uses a signal (such as PlayCollect) to instruct the MG to collect the user input. Therefore, the DTMF digit mask control information may be carried in a parameter of such a signal to indicate whether the DTMF digit information is suitable for storage in the record file of the MG For example, the parameter is named as Mask Digit (identified as "mkdt"). This parameter is a Boolean value. Two opposite values of the parameter indicate storage and non-storage of the DTMF digit information respectively. For example, the two values are "On" and "Off"; or the two values are "True" and "False", indicating whether the detected DTMF digit is suitable for storage in the record file or not. Either of the two opposite values is preset as a default value of the parameter. For example, the default value is "Off" or "False".

When the MG detects the DTMF digit input by the user, if the value of the mkdt parameter is "On", the MG is allowed to store the DTMF digit in the record file; if the value of the mkdt parameter is "Off", the MG is not allowed to store the DTMF digit into the record file. If the MG does not obtain any setting of the mkdt parameter, the default value "Off" applies. The control information represented by the mkdt parameter may be set by the MGC or another device, or preset on the MG.

If the MGC sets the control information and delivers it to the MG the communication between the MGC and the MG may be based on a (media) gateway control protocol. Currently, two commonly used gateway control protocols are the H.248/MeGaCo and the Media Gateway Control Protocol (MGCP), and the H.248/MeGaCo is an evolved product of the MGCP.

Figure 2:
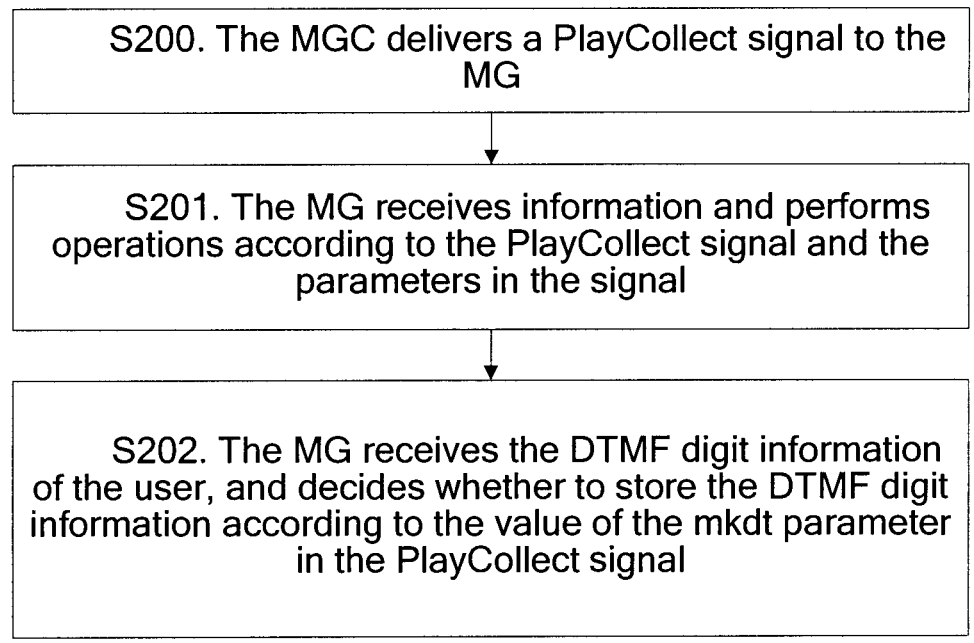
FIG. 2 is a flowchart of a method for controlling storage of user input information according to a second embodiment of the present invention.

FIG. 2 is a flowchart of the second embodiment of the present invention, which includes the following steps:

S200. The MGC delivers a PlayCollect signal to the MG. The signal carries an mkdt parameter to indicate whether the DTMF digit information detected by the MG is suitable for storage in the record file of the MG.

In this step, the MGC may analyze whether the information reported by the MG includes sensitive information of the user according to a session control process. For example, after the MGC instructs the MG to play a voice asking the user to input the credit card number, the DTMF digit information received and reported by the MG subsequently is obviously sensitive.

S201. The MG receives information and performs operations according to the PlayCollect signal and its parameters.

S202. The MG receives the DTMF digit information of the user, and decides whether to store the DTMF digit information according to the value of the mkdt parameter in the PlayCollect signal. If the value of the mkdt parameter is "On", the MG stores the DTMF signal into the record file; if the value of the mkdt parameter is "Off" or the default value applies, the MG does not store the DTMF digit information.

After the MGC delivers the PlayCollect signal to the MG, the MGC may deliver a command to modify the value of the mkdt parameter.

In this embodiment, the mkdt parameter may be preset on the MG. After receiving the DTMF digit information, the MG decides whether to store the DTMF digit information directly according to the preset value of the mkdt parameter, thus avoiding security risks brought by indiscriminate storage of the sensitive information in the DTMF digit information.

Figure 3:
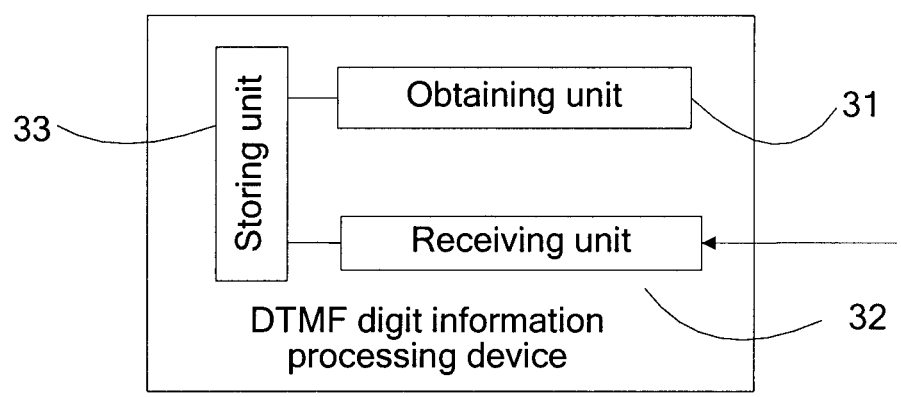
FIG. 3 shows a structure of a DTMF digit information processing device according to an embodiment of the present invention.

As shown in FIG. 3, a DTMF digit information processing device 30 is provided in an embodiment of the present invention. The DTMF digit information processing device 30 may be an MG, or a media resource processing device, or a media delivery function device.

The DTMF digit information processing device 30 includes:

an obtaining unit 31, configured to obtain DTMF digit mask control information which indicates whether the DTMF digit information is suitable for storage;

a receiving unit 32, configured to receive DTMF digit information; and a storing unit 33, configured to store the DTMF digit information received by the receiving unit 32 if the DTMF digit mask control information obtained by the obtaining unit 31 indicates that the DTMF digit information is suitable for storage.

The DTMF digit mask control information is sent by an MGC or another device to the MG, or is preset.

The DTMF digit information processing device 30 in this embodiment may further include a second receiving unit (not illustrated in the Figure), which is configured to receive the message delivered by the MGC or another device to the MG The message carries DTMF digit mask control information, and the obtaining unit 31 obtains the DTMF digit mask control information from the message.

Alternatively, the DTMF digit information processing device 30 may further include a setting unit (not illustrated in the Figure). The DTMF digit mask control information is set in the setting unit, and the obtaining unit obtains the DTMF digit mask control information from the setting unit.

Figure 4:
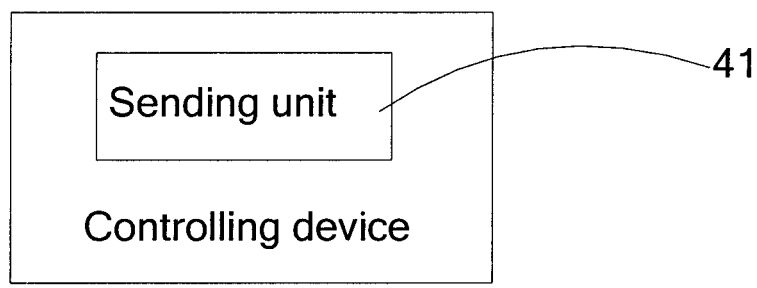
FIG. 4 shows a structure of a controlling device according to an embodiment of the present invention.

As shown in FIG. 4, a controlling device 40 is provided in an embodiment of the present invention. The controlling device 40 may be an MGC, or a media resource control device, or a media control function device. The controlling device 40 includes a delivering unit 41, which is configured to deliver DTMF digit mask control information to the DTMF digit information processing device, where the DTMF digit mask control information indicates whether the DTMF digit information is suitable for storage.

A system for controlling storage of user input information (not illustrated in the Figure) is provided in an embodiment of the present invention. The system includes a controlling device and a DTMF digit information processing device.

The structure of this controlling device is the same as that of the controlling device 40 above, and is configured to deliver DTMF digit mask control information to the DTMF digit information processing device, where the DTMF digit mask control information indicates whether the DTMF digit information is suitable for storage.

The structure of the DTMF digit information processing device is the same as that of the DTMF digit information processing device 40 above, and is not repeated here any further. The DTMF digit information processing device is configured to obtain the DTMF digit mask control information, and decide whether to store the received DTMF digit information according to the obtained DTMF digit mask control information after receiving the DTMF digit information.

It should be noted that the embodiments of the present invention are applicable to media resource servers in split architecture, namely, applicable to interaction between the media resource control device and the media resource processing device, or between the media control function device and the media delivery function device, with respect to signal setting and adjustment. In this case, the media resource control device or the media control function device is equivalent to the MGC, and the media resource processing device or the media delivery function device is equivalent to the MG.

In this way, the DTMF digit mask control information controls whether to store the user input information on the DTMF digit information processing device in the architecture with the service being separated from the bearer. When the DTMF digit mask control information indicates no permission of storing the received user information, the DTMF digit information processing device does not store the user information, thus avoiding information security risks brought by indiscriminate storage of sensitive contents in the user input information.

Through the descriptions of the preceding embodiments, those skilled in the art may understand that the present invention may be implemented by using software and a hardware platform, or by using hardware only. However, in most cases, using software and a hardware platform is preferred.

It should be noted that the above descriptions are merely some exemplary embodiments of the present invention, and those skilled in the art may make various improvements and refinements without departing from the spirit of the invention. All such modifications and refinements are intended to be covered by the present invention.

What is claimed:

1. In a media gateway (MG), a method for controlling storage of user input information, the method comprising:
    obtaining, from a media gateway controller (MGC), Dual Tone Multi-Frequency (DTMF) digit mask control information, which includes an indication that DTMF digit information may comprise sensitive user input information not suitable for storage;
    receiving DTMF digit information; and
    based on the indication in the obtained DTMF digit mask control information, deciding not to store the received DTMF digit information.

2. The method according to claim 1, wherein:
    the DTMF digit mask control information is expressed by a parameter of a signal capable of indicating collection of the DTMF digit information.

3. The method according to claim 2, wherein:
    the parameter is a Boolean value, and two opposite values of the parameter indicate whether to store the DTMF digit information or not respectively.

4. The method according to claim 3, wherein:
    one of the two opposite values is preset as a default value of the parameter, and wherein the default is set to not store the DTMF digit information.

5. A media gateway (MG), comprising:
    an obtaining unit, configured to obtain, from a media gateway controller (MGC), Dual Tone Multi-Frequency (DTMF) digit mask control information, which includes an indication that DTMF digit information may comprise sensitive user input information not suitable for storage;
    a receiver, configured to receive DTMF digit information; and
    a processor, configured to decide not to store the received DTMF digit information based on the indication in the DTMF digit mask control information.

6. The MG according to claim 5, further comprising:
    a storing unit, configured to store the DTMF digit information received by the receiving unit if the deciding unit decides that the DTMF digit information is allowed to be stored.

7. A computer program product for use in, or stored on, a media gateway (MG) that controls storage of user input information, the computer program product comprising computer executable instructions stored on a non-transitory computer readable medium in such a way that when executed by a processor, cause the MG to:
    obtain, from a media gateway controller (MGC), Dual Tone Multi-Frequency (DTMF) digit mask control information, which includes an indication that DTMF digit information may comprise sensitive user input information not suitable for storage;
    receive DTMF digit information; and
    based on the indication in the obtained DTMF digit mask control information, decide not to store the received DTMF digit information.

8. The computer program product according to claim 7, wherein:
    the DTMF digit mask control information is expressed by a parameter of a signal capable of indicating collection of the DTMF digit information.

9. The computer program product according to claim 8, wherein:
    the parameter is a Boolean value, and two opposite values of the parameter indicate whether to store the DTMF digit information or not respectively.

10. The computer program product according to claim 9, wherein:
    one of the two opposite values is preset as a default value of the parameter, and wherein the default is set to not store the DTMF digit information.

* * * * *